United States Patent
Takano

[11] 3,997,244
[45] Dec. 14, 1976

[54] ZOOM LENS HAVING WELL-COMPENSATED DISTORTION

[75] Inventor: Eiichi Takano, Tokyo, Japan

[73] Assignee: Canon Kabushiki Kaisha, Tokyo, Japan

[22] Filed: Dec. 20, 1973

[21] Appl. No.: 426,498

[30] Foreign Application Priority Data
Dec. 27, 1972  Japan .......................... 48-130037

[52] U.S. Cl. ............................................... 350/184
[51] Int. Cl.² ....................................... G02B 15/18
[58] Field of Search .................................... 350/184

[56] References Cited
UNITED STATES PATENTS
3,820,876  6/1974  Macher .............................. 350/184

Primary Examiner—John K. Corbin
Assistant Examiner—Conrad Clark
Attorney, Agent, or Firm—Toren, McGeady and Stanger

[57] ABSTRACT

A zoom lens comprising a convergent lens group as a focusing lens, a movable divergent lens group as a variator lens, a compensator lens group and a relay lens group being positioned in said order from an object side, wherein the interval between the principal point of said convergent lens group and the principal point of said divergent lens group is 70% to 130% of the absolute value of the focal distance taken by said divergent lens group when the focal distance of the total system is the minimum.

1 Claim, 27 Drawing Figures

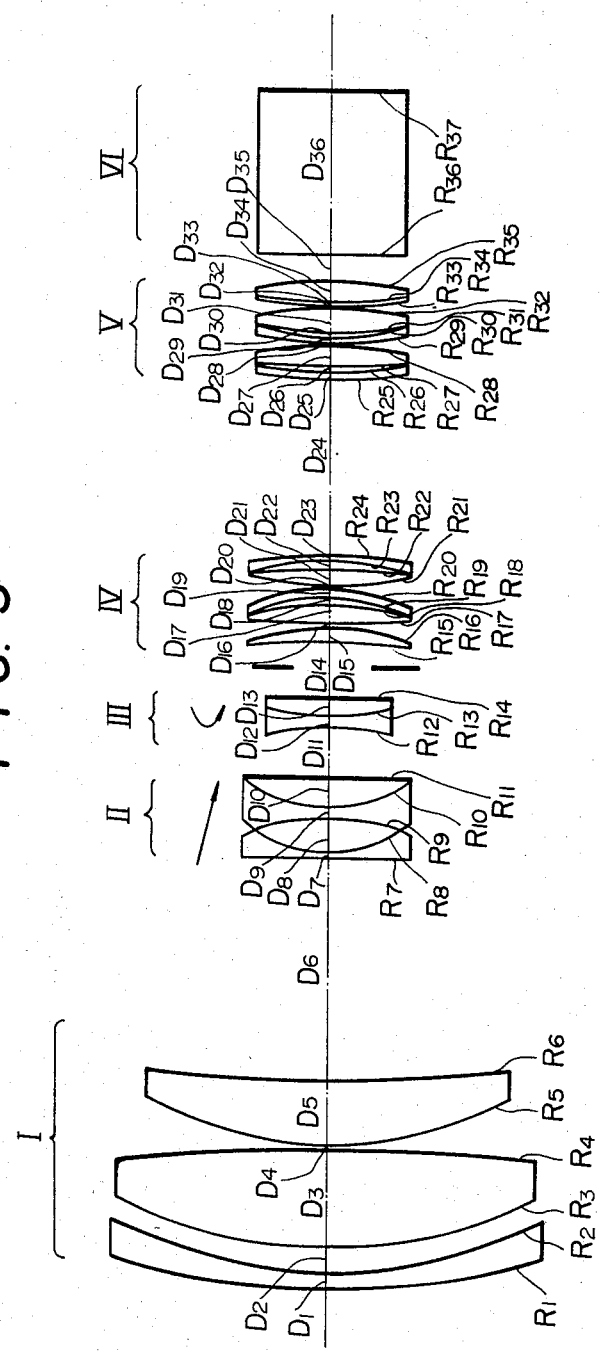

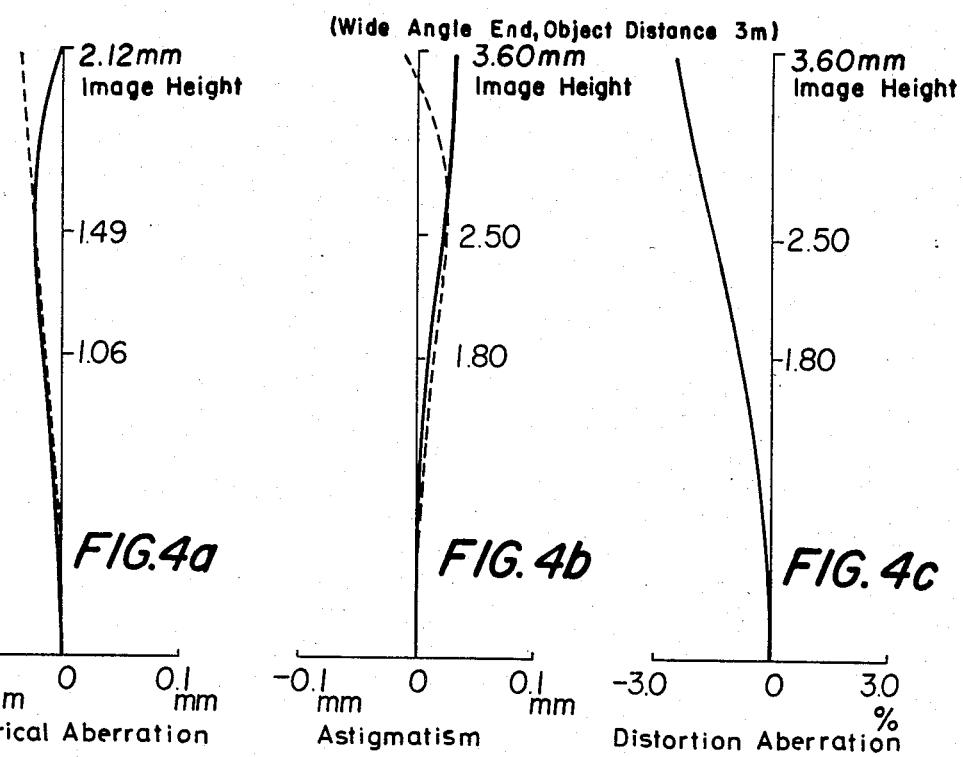
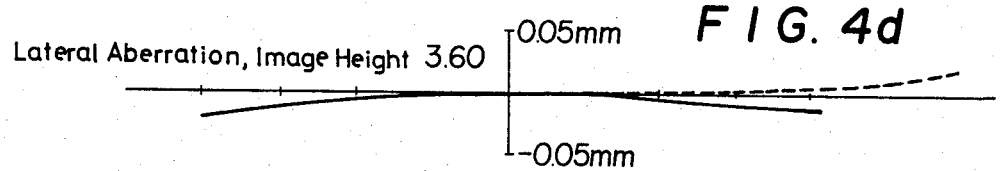
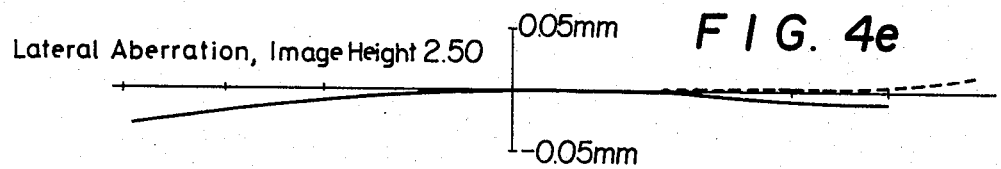
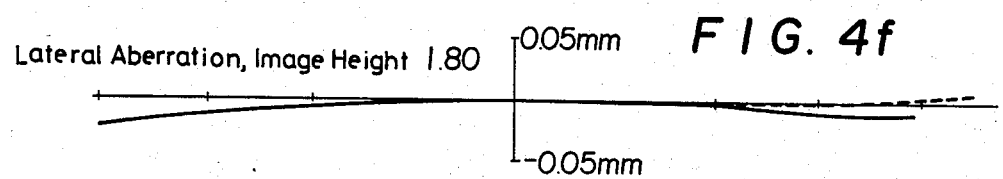
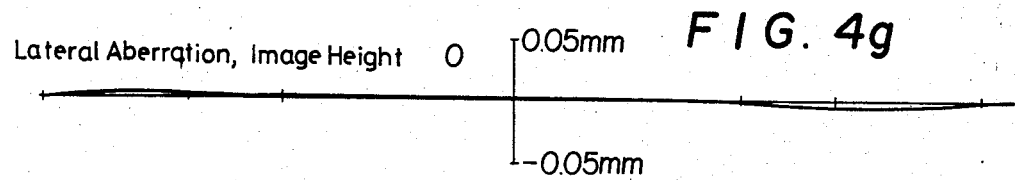

(Intermediate, Object Distance 3m)
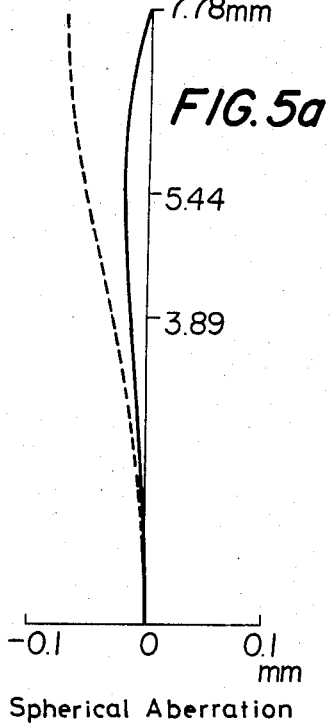
FIG.5a
Spherical Aberration
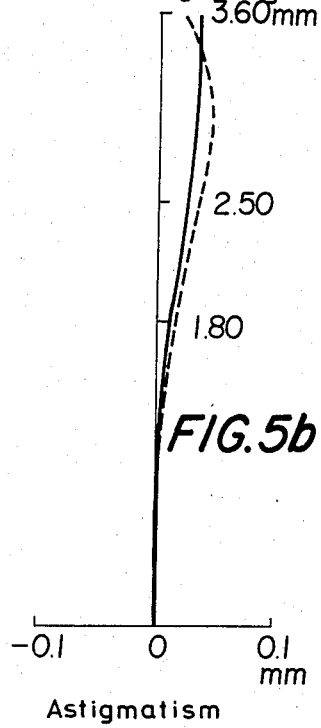
FIG.5b
Astigmatism
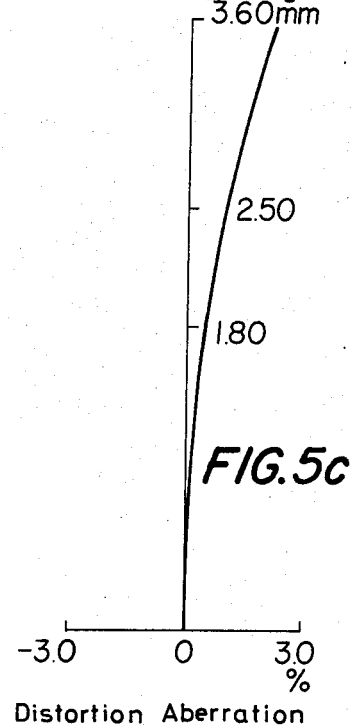
FIG.5c
Distortion Aberration
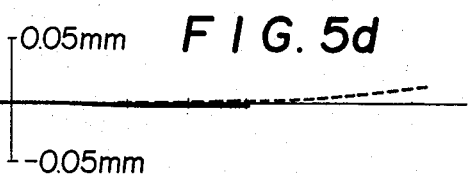
FIG. 5d
Lateral Aberration, Image Height 3.60
FIG. 5e
Lateral Aberration, Image Height 2.50
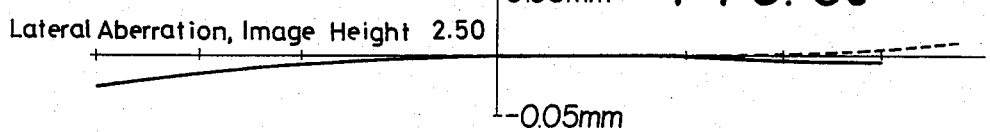
FIG. 5f
Lateral Aberration, Image Height 1.80
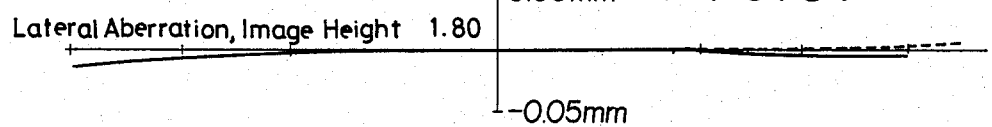
FIG. 5g
Lateral Aberration, Image Height 0
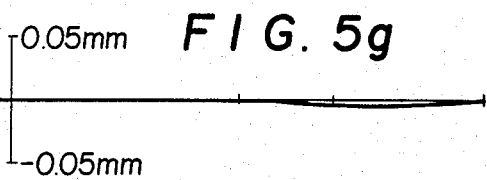

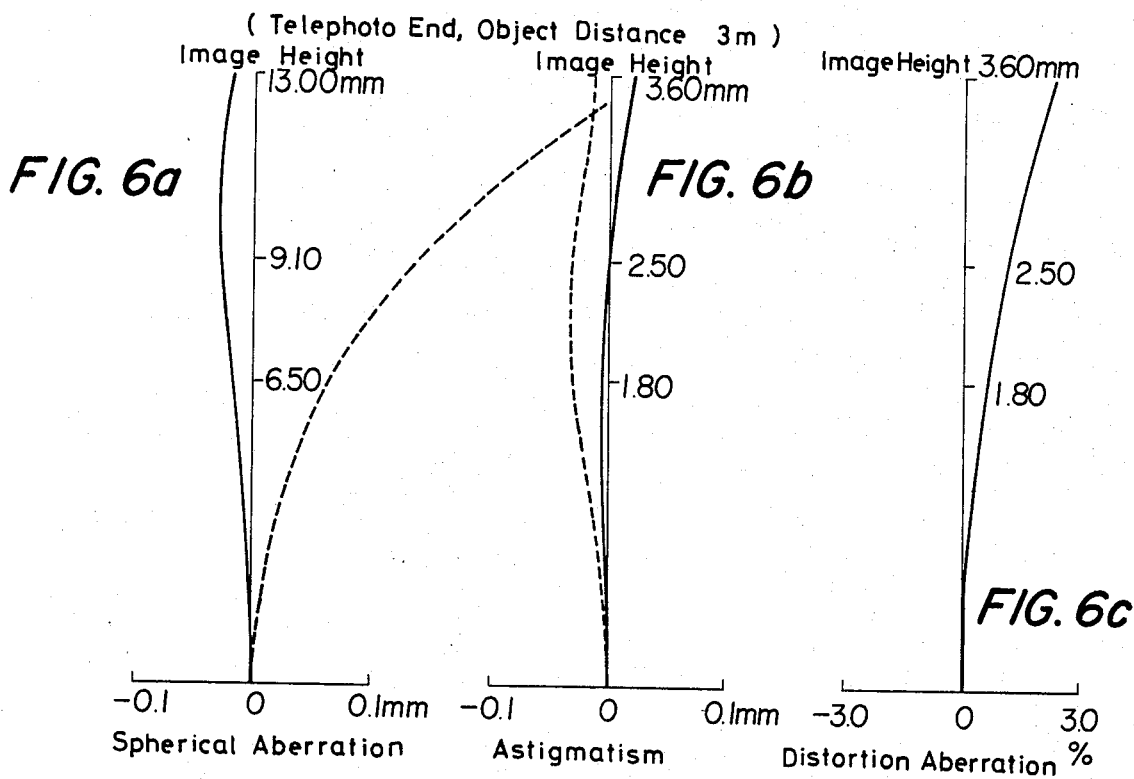
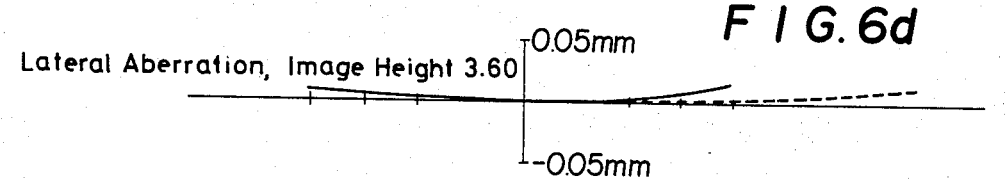
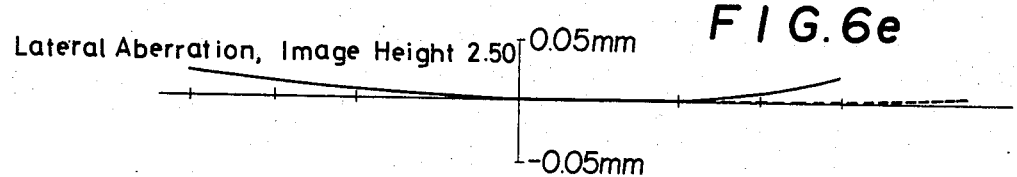
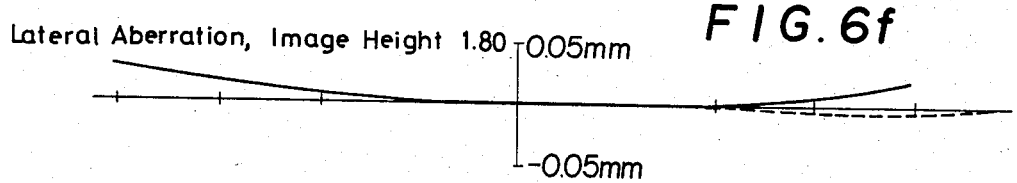
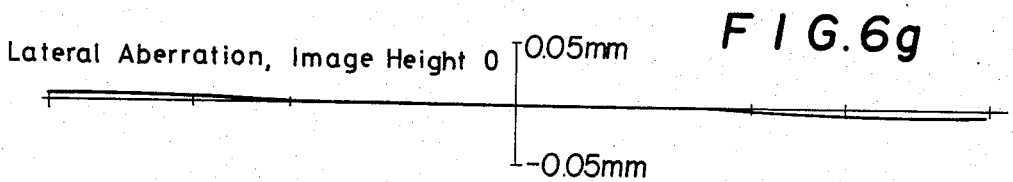

ZOOM LENS HAVING WELL-COMPENSATED DISTORTION

BACKGROUND OF THE INVENTION

The present invention relates to a zoom lens with high performance having a large magnification ratio and a high relative aperture, wherein the focal distance of total system at the wide angle side at the time of zooming can be such wide angle as being same with or larger than the length of diagonal line of the effective picture size.

It is well known as a conventional technical knowledge that in a zoom lens having a large magnification ratio and a high relative aperture wherein magnification variation can be made to considerable wide angle zone, the variation of various aberrations particularly coma (aberration) and distortion aberration make great variations along with zooming.

While it is possible to prevent either one of the coma (aberration) and distortion aberration, to prevent the both simultaneously has not been hitherto successful as the condition to prevent each one of them is in contradiction to that for the other.

OUTLINE OF THE INVENTION

It is the basis of the present invention that such conditions have been discovered that the distortion aberration can be compensated separately at the wide angle end at the time of zooming, with no relationship to the conditions for preventing the variation in coma (aberration) in a zoom lens having a large magnification ratio and a high relative aperture. Thus it is an object of the present invention to afford higher performance to a zoom lens having such angle of field as has been used conventionally by applying the above mentioned condition together with the conventionally known condition to prevent variation of coma (aberration).

It is also an object of the present invention to apply it to a zoom lens having such level of performance as that of a conventional lens, for enabling the same to have magnification variation to wider angle.

BRIEF EXPLANATION OF DRAWINGS

Each of FIG. 1a, FIG. 1b, FIG. 1c FIG. 3 is a lens system arrangement drawing of an example of the present invention. FIG. 4a through FIG. 4g are aberration drawings at wide angle end for an object distance of 3 m in connection with the example in FIG. 3. FIG. 5a through FIG. 5g are aberration drawings for intermediate zone. FIG. 6a through FIG. 6g are aberration drawings for telephoto ends.

Figure 1A:
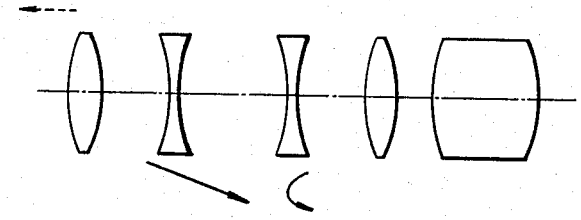
FIG. 1d shows an example of various types of zoom lenses to which the present invention can be applied.
Figure 1B:
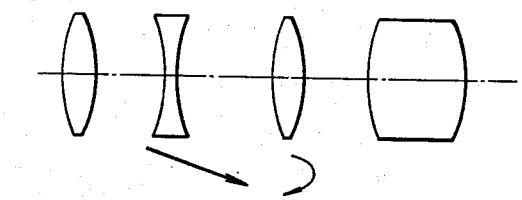
Figure 1C:
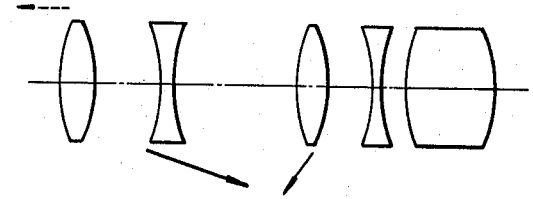
Figure 1D:
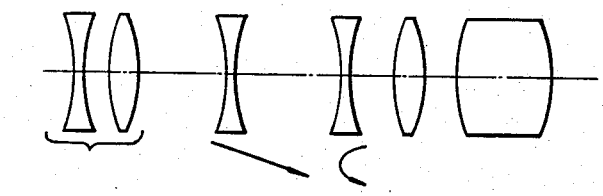

The characteristics of the present invention lie in that in a zoom lens comprising a first group of convergent lens group not moving in zooming, a second group of divergent lens group moving at the time of zooming a variator, and other lens group such as a compensator, etc., the principal point interval between the rear principal point of the first lens group and the front principal point of the second lens group is made 70% to 130% of the focal distance (absolute value) of the second lens group when the focal distance of the total system becomes the minimum. As the form of the zoom lens to which the present invention can be applied each example shown in FIG. 1a through FIG. 1d is included, in each of said examples the second lens group is of divergent type and moves as a variator in zooming. While the first lens group does not move in zooming, it may move in focusing. In the example of FIG. 1d the first lens group consists of positive and negative lenses, wherein only the negative lens moves in focusing.

Generally speaking, when the focal distance of a total system becomes minimum the zoom lens becomes of extreme retro type, then it will have negative distortion as a common nature of a retro type, while it becomes of extreme telephoto type when the focal distance of a total system becomes the maximum, then it will have positive distortion as a common nature of a telephoto type. This causes the variation of the distortion aberration along with zooming. In a zoom lens wherein the first lens group is convergent lens group which does not move in zooming and the second group is a divergent lens group as a variator lens which moves in zooming, a general means for reducing the variation in the distortion aberration at the time of zooming is to weaken the dispersive function of the refractive plane at the object side of the divergent lens as a variator so that the refractive plane at the image side bears more dispersive function and at the time the variation of spherical aberration which is apt to be deteriorated thereby is compensated by the first lens group. This works toward increasing the variation of coma (aberration) and the more the total system is made compact and the higher the relative aperture is made said drawback increases. From these points there is a great limitation in making the relative aperture higher and giving wider angle also making it compact, as the distortion aberration and the coma (aberration) will increase as the angle of field increases.

Figure 2:
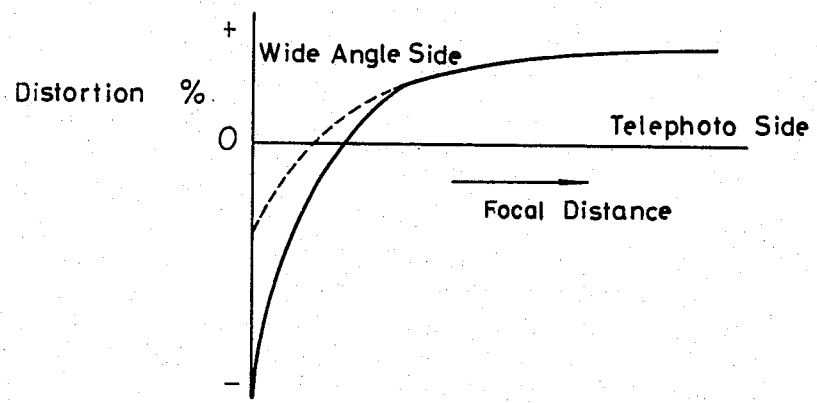
FIG. 2 is a diagram to explain the state of variation of the distortion aberration generated at conventionally known zoom lenses and the state it is compensated by the present invention.

On the other hand when the reduction of variation in coma (aberration) is given priority consideration in the above mentioned zoom lens, a generally adopted means therefor is to intensify the dispersive function at the refractive plane at the object side of the divergent lens as a variator, contrary to the above case, and to weaken the dispersive function at the refractive plane at the image side, that is in the lens system as shown in FIG. 3 which is an example of the present invention, the dispersive function at the planes $R_7$, $R_9$ is intensified while the dispersive function at the planes $R_8$, $R_{11}$ is weakened. This is reverse action to the reduction of variation of distortion aberration, therefore little can be expected from this compensation means, thus it has limitation with respect to F-number, the maximum angle of field, compactness, and performances. However, when the variation in the distortion aberration in this case is carefully studied it will be found that said variation suddenly becomes large and is deteriorated as it approaches to the wide angle end of zooming, as shown by solid line in FIG. 2. Thus, it suggests such principle that if such compensation means can be obtained that the distortion aberration will not become too big even only at the wide angle end as shown by broken line in the same drawing without jeopardizing the conventional coma (aberration) variation reduction means, the variation of the distortion variation can be reduced remarkably as a whole when the variation of the coma (aberration) is reduced. The present invention is based on the discovery that when the principal point interval between the fixed convergent lens group as the first group and the divergent variator lens group as the second group is made 70% to 130% of the focal distance of the second group at the time when the focal distance of the total system becomes the minimum, the results mentioned above can be obtained. When this value is below 70% the effect of the compensation will be small and when it exceeds 130% the height of luminous flux passing through the first lens group will be very far from the optical axis and the curvature of field in high order and the distortion in high order become remarkable thus it will be undesirable. As the above mentioned values were investigated on many conventional zoom lenses having this kind of lens arrangement from the view point of the present invention, they were found to be 30% to 50% and none of them were as high as those in the present invention.

Next, examples of values of properties of the zoom lens having such arrangement as in FIG. 3 to embody the present invention will be shown. In said drawing (I) is a convergent lens group which does not move in zooming (although moves in focusing), (II) is a divergent variator lens group, (III) is a compensator lens group, (IV) is a first relay lens group, (V) is a second relay lens group, and (VI) is a finder or a take out prism for an exposure sensing optical system.

R : represents in the order shown in radius of curvature of each refractive plane.

D : axial thickness or air space of each lens shown in the order given.

N : refractive index of glass composing each lens shown in the order given.

V : Abbe number of glass composing each lens shown in the order given.

Focal distance $f = 8.215 - 29.119 - 47.356$
F number = 1.8
Magnification ratio = 6
Back focus = 10.146

| | | | |
|---|---|---|---|
| $R_1 = 73.78$ | | | |
| | $D_1 = 1.60$ | $N_1 = 1.92286$ | $V_1 = 21.3$ |
| $R_2 = 43.90$ | | | |
| | $D_2 = 2.40$ | | |
| $R_3 = 46.98$ | | | |
| | $D_3 = 9.40$ | $N_2 = 1.61800$ | $V_2 = 63.4$ |
| $R_4 = -284.27$ | | | |
| | $D_4 = 0.15$ | | |
| $R_5 = 35.46$ | | | |
| | $D_5 = 7.00$ | $N_3 = 1.61800$ | $V_3 = 63.4$ |
| $R_6 = 153.35$ | | | |
| | $D_6 = $ variable* | | |
| $R_7 = 360.30$ | | | |
| | $D_7 = 0.65$ | $N_4 = 1.88300$ | $V_4 = 41.0$ |
| $R_8 = 13.20$ | | | |
| | $D_8 = 3.57$ | | |
| $R_9 = -24.56$ | | | |
| | $D_9 = 0.70$ | $N_5 = 1.78650$ | $V_5 = 50.2$ |
| $R_{10} = 14.64$ | | | |
| | $D_{10} = 2.65$ | $N_6 = 1.92286$ | $V_6 = 21.3$ |
| $R_{11} = 304.23$ | | | |
| | $D_{11} = $ variable* | | |
| $R_{12} = -25.83$ | | | |
| | $D_{12} = 0.65$ | $N_7 = 1.80610$ | $V_7 = 40.8$ |
| $R_{13} = 20.20$ | | | |
| | $D_{13} = 2.00$ | $N_8 = 1.80518$ | $V_8 = 25.4$ |
| $R_{14} = \infty$ | | | |
| | $D_{14} = $ variable* | | |
| $R_{15} = -70.31$ | | | |
| | $D_{15} = 1.60$ | $N_9 = 1.62041$ | $V_9 = 60.3$ |
| $R_{16} = -24.77$ | | | |
| | $D_{16} = 0.12$ | | |
| $R_{17} = 164.92$ | | | |
| | $D_{17} = 2.10$ | $N_{10} = 1.62041$ | $V_{10} = 60.3$ |
| $R_{18} = -30.79$ | | | |
| | $D_{18} = 0.66$ | | |
| $R_{19} = -18.77$ | | | |
| | $D_{19} = 0.65$ | $N_{11} = 1.80518$ | $V_{11} = 25.4$ |
| $R_{20} = -24.00$ | | | |
| | $D_{20} = 0.12$ | | |
| $R_{21} = 39.44$ | | | |
| | $D_{21} = 2.15$ | $N_{12} = 1.62041$ | $V_{12} = 60.3$ |
| $R_{22} = -83.36$ | | | |
| | $D_{22} = 0.61$ | | |
| $R_{23} = -32.68$ | | | |
| | $D_{23} = 0.65$ | $N_{13} = 1.80518$ | $V_{13} = 25.4$ |
| $R_{24} = -51.95$ | | | |
| | $D_{24} = 16.54$ | | |
| $R_{25} = 69.36$ | | | |
| | $D_{25} = 0.65$ | $N_{14} = 1.80518$ | $V_{14} = 25.4$ |
| $R_{26} = 33.92$ | | | |
| | $D_{26} = 0.13$ | | |
| $R_{27} = 214.90$ | | | |
| | $D_{27} = 1.85$ | $N_{15} = 1.71300$ | $V_{15} = 54.0$ |
| $R_{28} = -42.85$ | | | |
| | $D_{28} = 0.15$ | | |
| $R_{29} = 41.82$ | | | |
| | $D_{29} = 0.65$ | $N_{16} = 1.80518$ | $V_{16} = 25.4$ |
| $R_{30} = 25.93$ | | | |
| | $D_{30} = 0.29$ | | |
| $R_{31} = 34.51$ | | | |
| | $D_{31} = 2.10$ | $N_{17} = 1.71300$ | $V_{17} = 54.0$ |
| $R_{32} = -106.93$ | | | |
| | $D_{32} = 0.15$ | | |
| $R_{33} = 142.16$ | | | |
| | $D_{33} = 0.65$ | $N_{18} = 1.80518$ | $V_{18} = 25.4$ |
| $R_{34} = 47.62$ | | | |
| | $D_{34} = 2.10$ | $N_{19} = 1.71300$ | $V_{19} = 54.0$ |
| $R_{35} = -102.98$ | | | |
| | $D_{35} = 3.20$ | | |
| $R_{36} = 0$ | | | |
| | $D_{36} = 16.00$ | $N_{20} = 1.51633$ | $V_{20} = 64.1$ |
| $R_{37} = 0$ | | | |

*Variable Interval:

| | | | |
|---|---|---|---|
| f | 8.215 | 29.119 | 47.356 |
| $D_6$ | 1.197 | 20.213 | 24.642 |
| $D_{11}$ | 27.216 | 4.851 | 1.521 |
| $D_{14}$ | 2.097 | 5.446 | 4.348 |

The principal point interval between the first lens group and the second lens group at the time of the minimum focal distance = 8.584.

Focal distance of the second lens group = −10.400
The ratio of the above two = 83%
The following table shows total sum of each of tertial aberration coefficient in the minimum, intermediate, and the maximum in the above mentioned example:

| Focal distance | 8.215 | 29.119 | 47.356 |
|---|---|---|---|
| Spherical aberration | 0.2893 | 0.2459 | 0.2141 |
| Coma (aberration) | 0.1956 | 0.1269 | −0.1322 |
| Astigmatism | 0.0238 | 0.0298 | 0.0419 |
| Petzval sum | −0.0431 | −0.0431 | −0.0431 |
| Distortion aberration | 0.4068 | −0.2127 | −0.2426 |

Each of FIG. 4a through FIG. 4g, and FIG. 5a through FIG. 5g and FIG. 6a through FIG. 6g shows aberration drawing for an object distance of 3 m at a wide angle end, intermediate position and the telephoto end in the above mentioned example, ant it is known from said aberration drawings and from the above table of the aberration coefficient that the variation in the spherical aberration, astigmatism and coma (aberration) will be small and also the variation in the distortion aberration will be small.

What is claimed is:

1. A zoom lens having well-compensated distortion comprising:
a convergent focusing group, a divergent variator lens group, a compensator lens group and a relay lens group disposed in that order along an optical axis, said variator lens group moving on the optical axis at the time of zooming, said compensator lens group moving in association with the movement of the variator lens group, said variator and focusing lens groups having the relationship that the interval between a rear principal point of said focusing lens group and a front principal part of said variator lens group is substantially 83% of an absolute value of a focal length of said variator lens group when said focusing and variator lens groups are closest to each other, said zoom lens having the following values:

| | | |
|---|---|---|
| $R_1 = 73.78$ | | |
| $D_1 = 1.60$ | $N_1 = 1.92286$ | $V_1 = 21.3$ |
| $R_2 = 43.90$ | | |
| $D_2 = 2.40$ | | |
| $R_3 = 46.98$ | | |
| $D_3 = 9.40$ | $N_2 = 1.61800$ | $V_2 = 63.4$ |
| $R_4 = -284.27$ | | |
| $D_4 = 0.15$ | | |
| $R_5 = 35.46$ | | |
| $D_5 = 7.00$ | $N_3 = 1.61800$ | $V_3 = 63.4$ |
| $R_6 = 153.35$ | | |
| $D_6 =$ variable* | | |
| $R_7 = 360.30$ | | |
| $D_7 = 0.65$ | $N_4 = 1.88300$ | $V_4 = 41.0$ |
| $R_8 = 13.20$ | | |
| $D_8 = 3.57$ | | |
| $R_9 = -24.56$ | | |
| $D_9 = 0.70$ | $N_5 = 1.78650$ | $V_5 = 50.2$ |
| $R_{10} = 14.64$ | | |
| $D_{10} = 2.65$ | $N_6 = 1.92286$ | $V_6 = 21.3$ |
| $R_{11} = 304.23$ | | |
| $D_{11} =$ variable* | | |
| $R_{12} = -25.83$ | | |
| $D_{12} = 0.65$ | $N_7 = 1.80610$ | $V_7 = 40.8$ |
| $R_{13} = 20.20$ | | |
| $D_{13} = 2.00$ | $N_8 = 1.80518$ | $V_8 = 25.4$ |
| $R_{14} = \infty$ | | |
| $D_{14} =$ variable* | | |
| $R_{15} = -70.31$ | | |
| $D_{15} = 1.60$ | $N_9 = 1.62041$ | $V_9 = 60.3$ |
| $R_{16} = -24.77$ | | |
| $D_{16} = 0.12$ | | |
| $R_{17} = 164.92$ | | |
| $D_{17} = 2.10$ | $N_{10} = 1.62041$ | $V_{10} = 60.3$ |
| $R_{18} = -30.79$ | | |
| $D_{18} = 0.66$ | | |
| $R_{19} = -18.77$ | | |
| $D_{19} = 0.65$ | $N_{11} = 1.80518$ | $V_{11} = 25.4$ |
| $R_{20} = -24.00$ | | |
| $D_{20} = 0.12$ | | |
| $R_{21} = 39.44$ | | |
| $D_{21} = 2.15$ | $N_{12} = 1.62041$ | $V_{12} = 60.3$ |
| $R_{22} = -83.36$ | | |
| $D_{22} = 0.61$ | | |
| $R_{23} = -32.68$ | | |
| $D_{23} = 0.65$ | $N_{13} = 1.80518$ | $V_{13} = 25.4$ |
| $R_{24} = -51.95$ | | |
| $D_{24} = 16.54$ | | |
| $R_{25} = 69.36$ | | |
| $D_{25} = 0.65$ | $N_{14} = 1.80518$ | $V_{14} = 25.4$ |
| $R_{26} = 33.92$ | | |
| $D_{26} = 0.13$ | | |
| $R_{27} = 214.90$ | | |
| $D_{27} = 1.85$ | $N_{15} = 1.71300$ | $V_{15} = 54.0$ |
| $R_{28} = -42.85$ | | |
| $D_{28} = 0.15$ | | |
| $R_{29} = 41.82$ | | |
| $D_{29} = 0.65$ | $N_{16} = 1.80518$ | $V_{16} = 25.4$ |
| $R_{30} = 25.93$ | | |
| $D_{30} = 0.29$ | | |
| $R_{31} = 34.51$ | | |
| $D_{31} = 2.10$ | $N_{17} = 1.71300$ | $V_{17} = 54.0$ |
| $R_{32} = -106.93$ | | |
| $D_{32} = 0.15$ | | |
| $R_{33} = 142.16$ | | |
| $D_{33} = 0.65$ | $N_{18} = 1.80518$ | $V_{18} = 25.4$ |
| $R_{34} = 47.62$ | | |
| $D_{34} = 2.10$ | $N_{19} = 1.71300$ | $V_{19} = 54.0$ |
| $R_{35} = -102.98$ | | |
| $D_{35} = 3.20$ | | |
| $R_{36} = 0$ | | |
| $D_{36} = 16.00$ | $N_{20} = 1.51633$ | $V_{20} = 64.1$ |
| $R_{37} = 0$ | | |

*Variable Interval:

| f | 8.215 | 29.119 | 47.356 |
|---|---|---|---|
| $D_6$ | 1.197 | 20.213 | 24.642 |
| $D_{11}$ | 27.216 | 4.851 | 1.521 |
| $D_{14}$ | 2.097 | 5.446 | 4.348 | where
R; radius of curvature of each refractive surface.
D; axial thickness or air space of each lens.
N; refractive index of glass composing each lens.
V; Abbe number of glass composing lens.

* * * * *

UNITED STATES PATENT OFFICE
CERTIFICATE OF CORRECTION

Patent No. 3,997,244  Dated December 14, 1976

Inventor(s) Eiichi Takano

It is certified that error appears in the above-identified patent and that said Letters Patent are hereby corrected as shown below:

In the heading of the Patent [30] should read as follows:

-- [30] Foreign Application Priority Data

Dec. 27, 1972  Japan..........47-130037--.

Signed and Sealed this

First Day of March 1977

[SEAL]

Attest:

RUTH C. MASON  
Attesting Officer

C. MARSHALL DANN  
Commissioner of Patents and Trademarks